US009423827B2

(12) United States Patent
Compton et al.

(10) Patent No.: US 9,423,827 B2
(45) Date of Patent: Aug. 23, 2016

(54) HEAD MOUNTED DISPLAY FOR VIEWING THREE DIMENSIONAL IMAGES

(71) Applicants: Katherine Compton, Santa Cruz, CA (US); John T. Murray, Santa Cruz, CA (US); Douglas L. Michels, Santa Cruz, CA (US)

(72) Inventors: Katherine Compton, Santa Cruz, CA (US); John T. Murray, Santa Cruz, CA (US); Douglas L. Michels, Santa Cruz, CA (US)

(73) Assignee: SEEBRIGHT INC.

( * ) Notice: Subject to any disclaimer, the term of this patent is extended or adjusted under 35 U.S.C. 154(b) by 248 days.

(21) Appl. No.: 13/667,200

(22) Filed: Nov. 2, 2012

(65) Prior Publication Data

US 2013/0141360 A1 Jun. 6, 2013

Related U.S. Application Data

(60) Provisional application No. 61/565,557, filed on Dec. 1, 2011.

(51) Int. Cl.
| | |
|---|---|
| *G09G 5/00* | (2006.01) |
| *G06F 1/16* | (2006.01) |
| *G06F 3/01* | (2006.01) |
| *G06F 3/0482* | (2013.01) |
| *H04N 13/04* | (2006.01) |

(52) U.S. Cl.
CPC .............. *G06F 1/1632* (2013.01); *G06F 3/012* (2013.01); *G06F 3/0482* (2013.01); *H04N 13/044* (2013.01); *H04N 13/0459* (2013.01); *G06F 2200/1637* (2013.01)

(58) Field of Classification Search
CPC ....... G06F 3/041; G06F 1/1632; G06F 3/012; G06F 3/0482; G06F 2200/1637; G09G 5/00; H04N 13/0459; H04N 13/044

USPC ............................................................ 345/8
See application file for complete search history.

(56) References Cited

U.S. PATENT DOCUMENTS

| | | | |
|---|---|---|---|
| 2009/0073330 A1* | 3/2009 | Viala ............................... | 349/11 |
| 2010/0079356 A1* | 4/2010 | Hoellwarth ....................... | 345/8 |
| 2012/0120498 A1* | 5/2012 | Harrison et al. ............... | 359/630 |

OTHER PUBLICATIONS

Apptoyz-AppBlaster, (Nov. 7, 2012) http://www.apptoyz.com/blog/.
FOV2GO (May 19, 2012) San Mateo, CA., http://projects.ict.usc.edu/mxr/blog/fov2go-at-maker-faire-may-19-20/.
Project Glass (Nov. 2, 2012) Google+, https://plus.google.com/+projectGlass.
MY3D 360-Degree Handheld Viewer, (Mar. 31, 2011), http://www.hasbro.com/hasbromy3d/en_us/news.cfm.
Lazer Tag Toy, (Aug. 3, 2012) Hasbro, 11 pp.
App Blaster (Jan. 25, 2011) http://www.pocket-lint.com/news/38099/app-gun-apptoyz-remote-control, 8 pp.
App Blaster iPhone Gun (Review), (Sep. 27, 2011); http://www.phonesreview.co.uk/2011/09/27/app-blaster-iphone-gun-hands-on-review.

(Continued)

*Primary Examiner* — Towfiq Elahi
(74) *Attorney, Agent, or Firm* — Soquel Group LLC (57) ABSTRACT

A head mounted display device that displays three dimensional images from a mobile device, which includes a strap that secures the head mounted display to the head of a viewer, a viewing assembly connected to the strap, that includes a housing, a mobile device holder, connected to the housing, a reflecting surface, connected to the housing, that reflects images displayed by the mobile device; and an eyepiece, connected to the housing, onto which the reflecting surface reflects the images.

9 Claims, 11 Drawing Sheets

(56) References Cited

OTHER PUBLICATIONS

Handrahan, "Oculus Rift and the Virtual Reality Revolution" (Dec. 18, 2012) 6 pp.

Smart Glasses Technology (Jan. 7, 2012) VUZIX, Las Vegas, NV, 2 pp http://www.vuzix.com.

Nomad (Sep. 1, 2002) MicroVision, http://gizmodo.com/009716/microvision-nomad-heads-up-display, 2 pp.

Wrap 1200 (Aug. 12, 2011), VUZIX, 2 pp.

* cited by examiner

Example 1: Menu Navigation

| Button activity | Slider activity | | | Head Tilt | |
|---|---|---|---|---|---|
| | None | Slides Up | Slides Down | Head Tilts Left | Head Tilts Right |
| Press Back Button | Return to the previous screen | - | - | - | - |
| Press Select Button | Activate the currently selected Option | - | - | - | - |
| Press Both Buttons At Same Time | Perform "special" action (as defined by mobile device software) | - | - | - | - |
| No Button Pressed | - | Select previous item | Select Next Item | Select Option to Left | Select Option To Right |

*FIG. 10A*

Example 2: 3D Immersive Game

|  | Slider Action | | |
|---|---|---|---|
| Button Action | None | Slides Up | Slides Down |
| Press Back Button | Pause the game and return to the game opening screen | | |
| Press Select Button | Fire a missile in the current direction | | |
| Press Both Buttons At Same Time | Activate shields | | |
| No Button Pressed | | Move the angle of the weapon to the left | Move the angle of the weapon to the right |

*FIG. 10B*

Example 3: Movie Player

|  | Slider Action | | |
|---|---|---|---|
| Button Action | None | Slides Up | Slides Down |
| Press Back Button | Exit the movie, and return to selection menu | | |
| Press Select Button | Pause or play the movie | | |
| Press Both Buttons At Same Time | Activate an 'options' menu | | |
| While Select Button Is Held Down | | Fast forward the movie | Rewind the movie |

*FIG. 10C*

Example 4: Driving Game

|  | Slider Action | | |
|---|---|---|---|
| Button Action | None | Slides Up | Slides Down |
| Press Back Button | Brake and begin backing up the car | Move in reverse while turning left | Move in reverse while turning right |
| Press Select Button | Accelerate the car | Accelerate forward while turning left | Accelerate forward while turning right |
| Press Both Buttons At Same Time | Activate speed 'boost' | | |
| No Button Pressed | | Turn left | Turn right |

*FIG. 10D*

HEAD MOUNTED DISPLAY FOR VIEWING THREE DIMENSIONAL IMAGES

REFERENCE TO RELATED APPLICATIONS

This application claims benefit of U.S. Provisional Application No. 61/565,557, entitled "Hands-free visual interface for a portable electronic device", filed on Dec. 1, 2011 by inventor Kate Compton.

FIELD OF THE INVENTION

The present invention relates generally to head mounted displays, and particularly to a head mounted display that projects a stereoscopic image from an attached mobile electronics device onto an eyepiece, which gives the effect of a three-dimensional virtual image superimposed on the real world.

BACKGROUND

Three dimensional images (3D) are increasingly used to display vivid images in movies, electronic games and in other applications. For example 3D movies are displayed in theatres and are viewed by persons equipped with special 3D glasses. Additionally, 3D movies and electronic games may be displayed on specially equipped televisions or computer displays to viewing by persons equipped with special 3D glasses.

The basic approach to displaying 3D images is to display two slightly offset images separately to the left and right eye. The two principal strategies have been used to accomplish this are: (1) for the viewer to wear a special 3D eyepiece that filters each offset image to a different eye; and (2) to split the light source directionally into each of the viewer's eyes, thus eliminating the need for special glasses.

One increasingly common approach to projecting stereoscopic image pairs is a head mounted display system that mounts to a person's head and that displays a virtual image on an attached eyepiece. Head mounted displays are often used in simulators or for games, though they can also be used to view media such as movies or digital photos.

A portable or mobile electronics device, referred to hereinbelow as a mobile device, such as a smartphone, is capable of generating and displaying a stereoscopic or 3D movie or image that when projected onto an eyepiece appears to a viewer to have depth, i.e. three dimensions. This approach offers a low cost, mobile, solution to viewing 3D images since mobile electronics devices such as smartphones are widespread. Therefore, it would be desirable to able to attach a mobile device to a head mounted display that properly displays 3D images or movies on an attached eyepiece.

Such a device could also be used to view traditional, 2D media, including images, photos and web content in the form of a virtual display in front of the viewer. This would be desirable because of the relative size and comfortable position of the virtual display as compared to a laptop or small screen device.

SUMMARY OF THE INVENTION

The present invention discloses a head mounted display that includes a frame that fits around the head of a viewer, an optical assembly secures a mobile device and projects a three dimensional (3D) image displayed by the, mobile device onto an eyepiece that is also attached to the frame. The image displayed may also be flat, or two dimensional, if the image delivered to both eyes is identical. The 3D image may be moving or still. Further, the eyepiece may be partially transparent, which has the effect of superimposing the 3D image on the real world as seen through the eyepiece.

In one embodiment, the head mounted display includes mechanical controls that a viewer wearing the head mounted display uses to activate functions on the secured mobile device. In one embodiment, the mechanical controls comprise two push buttons and a slider. In one embodiment, the mobile device includes a touch sensitive display screen and pressing a push button causes the mechanical control to make contact with the touch sensitive display screen thereby issuing a command to the mobile device. The mobile device in turn performs a corresponding function such as back, select, move cursor up, or move cursor down. In one embodiment, the mechanical controls include a slider that can be used, for example, select the next item, select the option to the left or right or to move the angle of a weapon in a 3D immersive game.

In one embodiment, the subject invention displays three dimensional images from a mobile device, and includes a strap that secures the head mounted display to the head of a viewer, a viewing assembly connected to the strap, that includes a housing, a mobile device holder, connected to the housing, a reflecting surface, connected to the housing, that reflects images displayed by the mobile device; and an eyepiece, connected to the housing, onto which the reflecting surface reflects the images.

In one embodiment, the subject invention includes a system for controlling a mobile device from a head mounted display that includes a head mounted display which includes a holder for a mobile device for securing the mobile device in place, the mobile device including a touch sensitive display screen, and a plurality of mechanical controls, each of which, when activated by a viewer, contacts the touch sensitive display screen, and a mobile device that includes a touch sensitive display screen, a processor, and a memory in communication with the processor for storing instructions, which when executed by the processor cause the mobile device to display a graphical user interface containing a plurality of selectable commands, each command corresponding to a function to be performed by the mobile device; and upon activation by the viewer of at least one of the plurality of mechanical controls causing contact with the touch sensitive display screen, to receive a selection of one of the plurality of selectable commands; and to perform the function corresponding to the selected command.

BRIEF DESCRIPTION OF THE DRAWINGS

The present invention will be more fully understood and appreciated from the following detailed description, taken in conjunction with the drawings in which.

DETAILED DESCRIPTION

The invention will be more completely understood through the following detailed description, which should be read in conjunction with the attached drawings. Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

As used herein the following terms have the meanings given below:

Three-dimensional (also referred to as 3D) image—means a digital image which when projected onto a display such as an eyepiece in the present invention or onto a television or movie screen gives an illusion of depth, i.e. the 3D image enhances the viewers depth perception. One approach to 3D imagery uses a technique referred to as stereoscopy or stereoscopics in which two images, each recorded from a slightly different perspective, are presented separately to the left and right eye of the viewer. These two-dimensional images are then combined by the viewer's brain to generate a single stereoscopic, or stereographic, image that gives the perception of depth.

Mobile device—as used herein refers to an intelligent portable device that runs computer programs and has an integrated display capable of displaying digital images. Typical examples include smartphones such as the IPHONE from Apple Computer and the GALAXY from the Samsung Electronics Co. Other examples include inter alia pad computers, portable computers, personal digital assistants and electronic game consoles. Although mobile device typically provide telephonic and/or Internet access, a mobile device as referred to herein does not necessarily provide such communications.

Eyepiece—a surface onto which an image is projected. An eyepiece is typically constructed of a transparent or partially transparent material such as glass or plastic although it may also be opaque. An eyepiece may consist of two elements, i.e. one for each eye or of a single element. If an image is projected onto an opaque eyepiece then the viewing experience is said to be immersive. An eyepiece typically does not perform an optical transformation, as in the case of a lens for glasses, which corrects for vision defects. However, in some cases an eyepiece used in the present invention might be combined with an optical lens for optical correction or for other purposes.

Figure 1A:
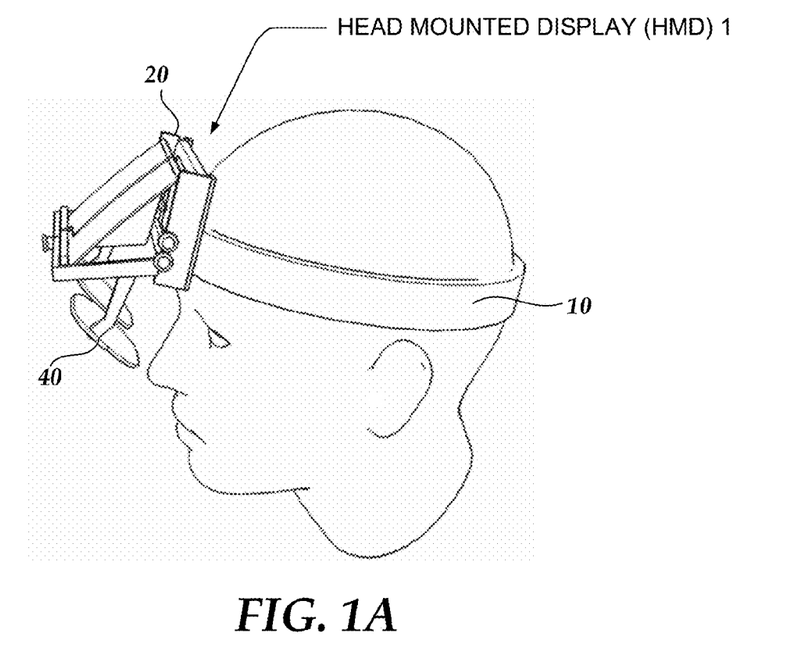
FIGS. 1A and 1B are simplified illustrations of a viewer wearing a head mounted display inside of which a mobile device is mounted.
Figure 1B:
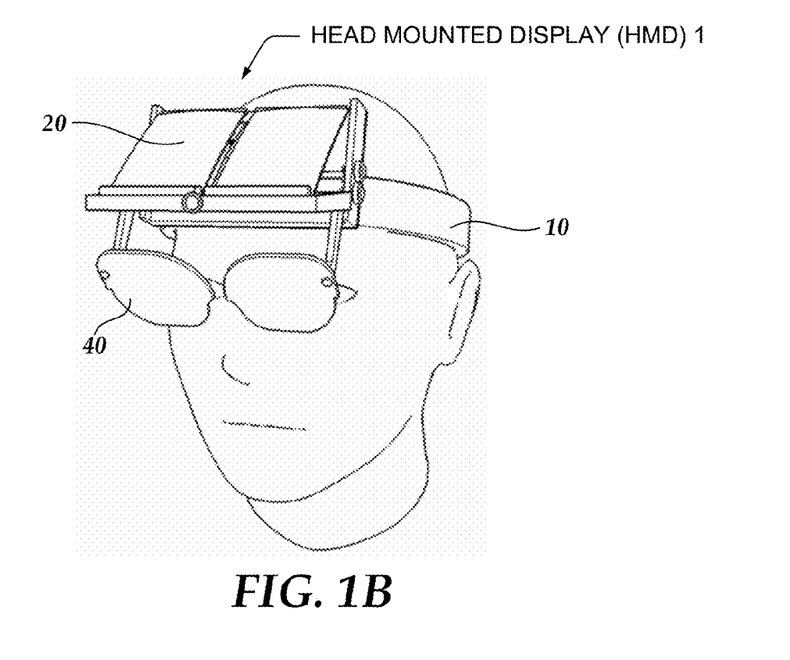

FIGS. 1A and 1B are simplified illustrations of a head mounted display 1 seen from the side and front perspectives respectively. HMD 1 comprises a strap 10 that binds or secures HMD 1 to a viewer's head, a viewing assembly 20, described in further detail below with reference to FIGS. 2A and 2B, that secures a mobile device and projects images from the mobile device onto an eyepiece 40.

Strap 10 must be both comfortable and sufficiently sturdy to prevent HMD 1 from slipping or tilting downwards or laterally. For example, plastic ratchet straps may be used. Most preferably, the strap is user adjustable.

In a preferred embodiment, eyepiece 40 consists, as indicated below in FIGS. 1A-B, of two separate elements that are attached to viewing assembly 20. In another embodiment, eyepiece 40 may take the form of a single element.

Figure 2A:
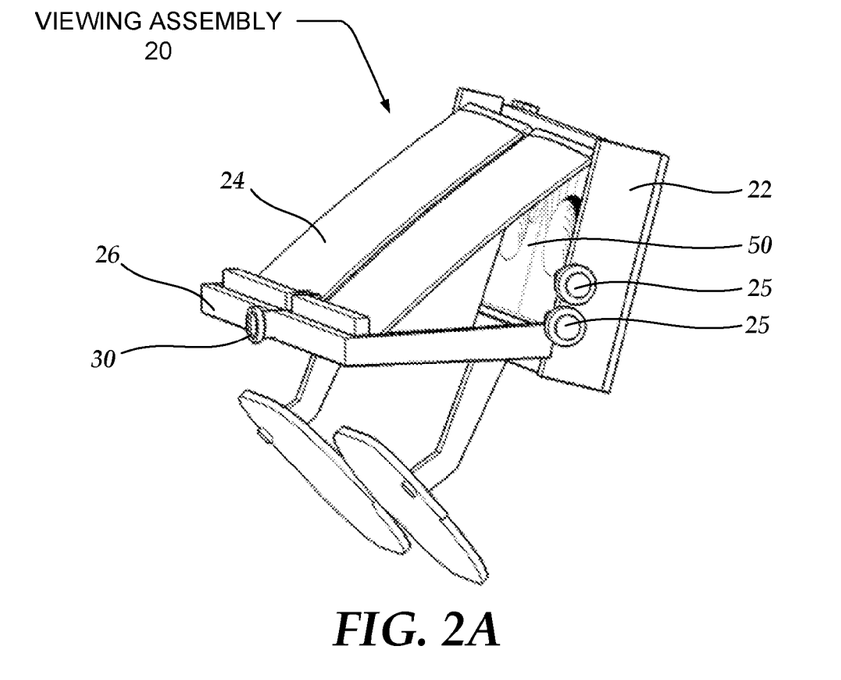
FIGS. 2A and 2B are isometric illustrations of a viewing assembly of a head mounted display.
Figure 2B:
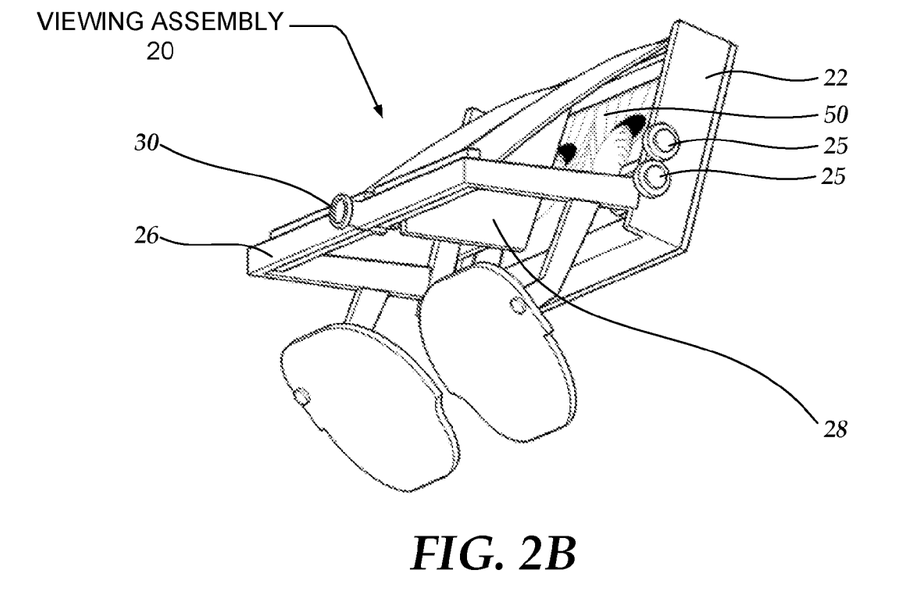

FIGS. 2A and 2B are isometric illustrations of viewing assembly 20 of head mounted display 1. FIG. 2A is an isometric illustration from a front right perspective and FIG. 2B is an isometric illustration from a top right perspective. Viewing assembly 20 includes a mobile device holder 22 that secures a mobile device 50, a reflecting surface 24, and a housing 26 that rigidly connects strap 10, mobile device holder 22, reflecting surface 24 and eyepiece 40. Viewing assembly 20 includes one or more mobile device controls 25 that can be activated by a viewer. Mobile device controls 25 enables a viewer to select functions from a user interface presented by mobile device 50. One embodiment of mobile device controls 25 is given hereinbelow with reference to FIGS. 4-6. In one embodiment, viewing assembly 20 also includes a camera 30. Camera 30 is a camera or video camera (camcorder) subsystem that provides digital video, digital still and/or digital sound input to mobile device 50. In one embodiment, a cable runs from camera 30 to mobile device 50 along housing 26. Camera 30 may be used inter alia to provide sensor inputs to mobile device 50 to enable mobile device 50 to perform image processing functions such as acial motion capture, or face recognition.

Mobile device holder 22 holds mobile device 50 securely such that mobile device 50 is prevented from slipping or falling out when the viewer moves his/her head. Mobile device holder 22 enables a viewer to easily insert and withdraw mobile device 50. For example, in one embodiment, mobile device 50 slides into a slot and snaps into place. Mobile device holder 22 is described in further detail hereinbelow with reference to FIGS. 4A-B.

Although not show in the figures, viewing assembly 20 and housing 26 may include suitably placed holes and clips for peripheral cables, such as speaker and microphone cables, to easily attach to mobile device 50.

Reflecting surface 24 comprises two spherical or parabolic surfaces, as depicted in FIG. 2A, such as mirrors, that are shaped and angled to reflect light emanating from mobile device 50 onto a respective side of eyepiece 40. In one embodiment, reflecting surface 24 is formed of two rectangular, convex mirrors, consisting of a right side mirror that reflects light from an image displayed on the right side of mobile device 50 onto a right side of eyepiece 40 and a left side mirror that reflects light from an image displayed on the left side of mobile device 50 onto the left side of eyepiece 40.

The shape of reflecting surface 24 is optimized to display images that display on mobile device 50 onto eyepiece 40. Reflecting surface 24 may take on a variety of shapes including rectangular, and trapezoidal. Further, reflecting surface 24 may formed from a variety of materials including glass, plastic and metal.

In one embodiment, housing 26 includes an optical block 28 that blocks light from crossing from one side to another and prevents "crossover interference", which is when one eye sees the image intended for another eye. Optical block 28 is a nontransparent, typically dark, substance such as plastic that is placed between the two sides of reflecting surface 24.

In one embodiment, housing 26 is fabricated using an injection molded lightweight structure such as plastic or metal alloy. In one embodiment, housing 26 is a single continuous piece of material such as molded plastic. In another embodiment, one or more of the components of housing 26 are separate pieces that are securely attached or bonded together.

Figure 3A:
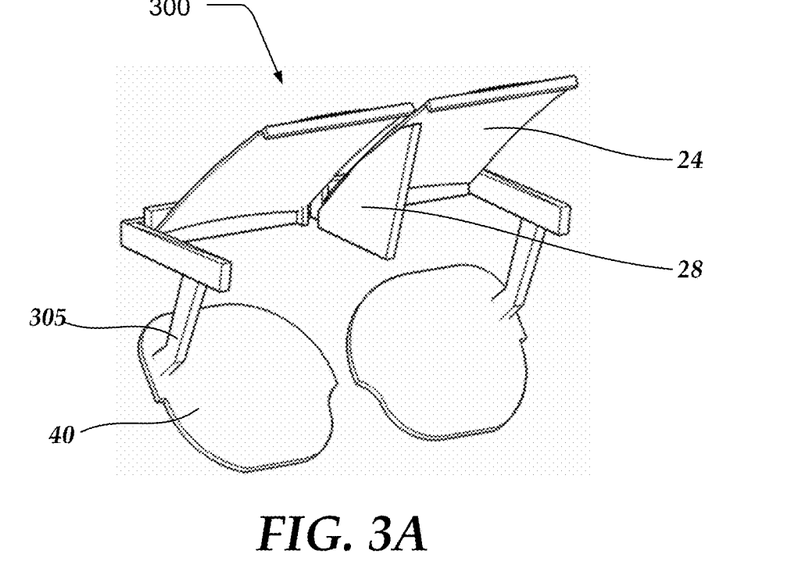
FIGS. 3A and 3B are isometric illustrations of a viewing assembly without a mobile device holder.
Figure 3B:
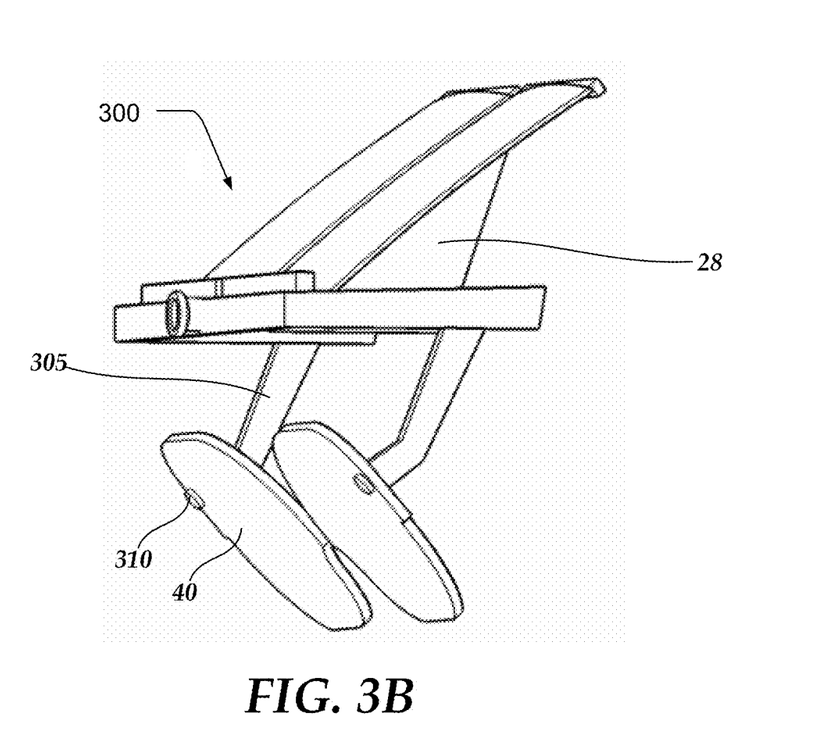

FIGS. 3A and 3B are isometric illustrations of viewing assembly 20 without mobile device holder 22. FIG. 3A is an isometric illustration from a rear perspective and FIG. 2B is an isometric illustration from a right side perspective. FIGS. 3A and 3B illustrate the role of optical block 28 in acting as an optical shield to prevent light from crossing from the right to the left or the left to the right sides as it travels from mobile device 50 (not depicted in this illustration) to reflecting surface 24 and then onto eyepiece 40.

In both FIGS. 3A and 3B, housing 26 includes a downward extension, referred to as arm 305, to which eyepiece 40 attaches. In one embodiment, illustrated in FIG. 3B, eyepiece 40 is secured to arm 305 by pressing it over an end-cap 310 portion of arm 305. In one embodiment, arm 305 swivels or travels up and down, similar to enable a view to move eyepiece 40 out of their field of vision.

Figure 4A:
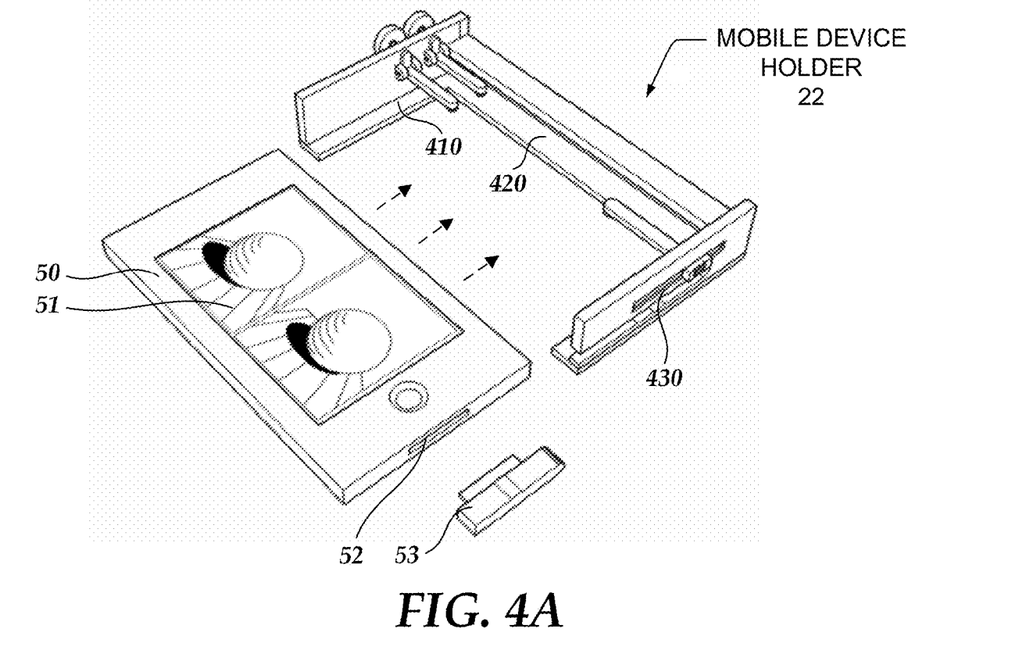
FIGS. 4A and 4B are illustrations of a mobile device holder of a viewing assembly for a head mounted display.
Figure 4B:
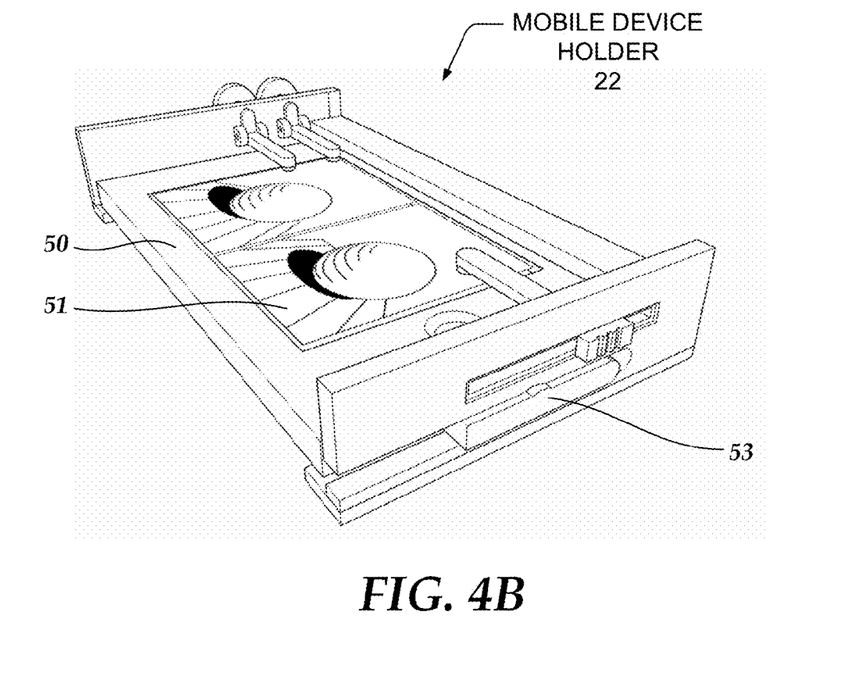

FIGS. 4A and 4B illustrate mobile device holder 22 and how it secures mobile device 50. In FIG. 4A mobile device 50 is shown to the left of mobile device holder 22. In FIGS. 4A-B two slightly offset images are shown on display 51; when correctly viewed, the two images are interpreted by the viewer as forming a single stereoscopic 3D image. To insert mobile device 50 into mobile device holder 22, a viewer slides mobile device 50 to the right, on top of guide 410 until it reaches a rear slot 420. In one embodiment, a port extender 53 may be placed through opening 430 of mobile device holder 22 and into a mobile device connector slot 52. Note that the term "dock connector" is also used to refer to the same function or device as port extender. In another embodiment, port extender 53 may be fitted first into connector slot 52 and then a viewer slides mobile device 50 along guide 410 until it reaches rear slot 420. In yet another embodiment, mobile device 50 may slide through the side of mobile device holder 22 and into place. Further, another type of device or connector, such as a USB connector may be connected to connector slot 52 at a given time rather than port extender 53, enabling mobile device 50 to be recharged or to communicate with a computer or other electronics device.

Port extender 53 is an element that extends, or elongates, the communications and power connection provided by mobile device connector slot 52. In one embodiment it protrudes through HMD 1 enabling a viewer to connect mobile device 50 to other electronics devices such as an external battery. Port extender 53 makes a passive, i.e. unpowered, electrical connection with mobile device 50 via mobile device connector slot 52.

Figure 5A:
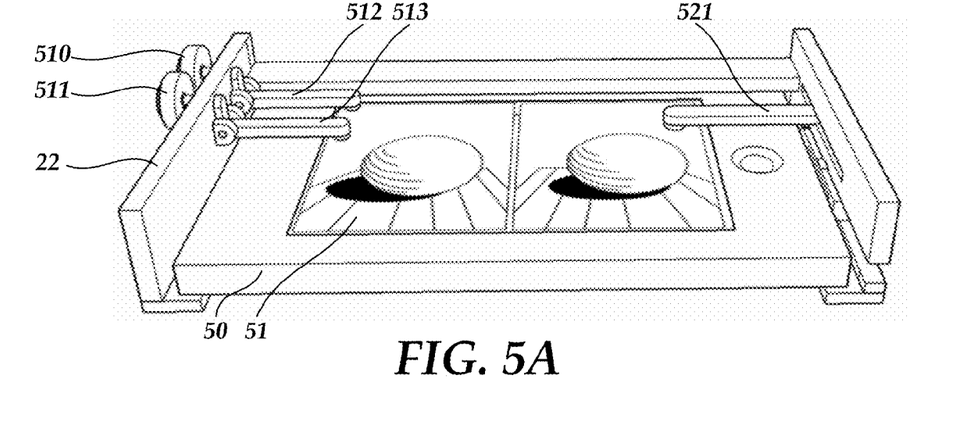
FIGS. 5A, 5B and 5C are illustrations of a preferred embodiment of mobile device controls for a head mounted display that includes a mobile device.
Figure 5B:
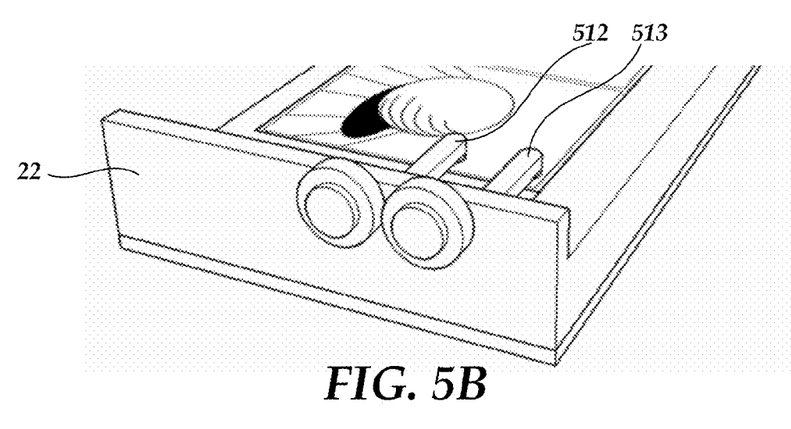
Figure 5C:
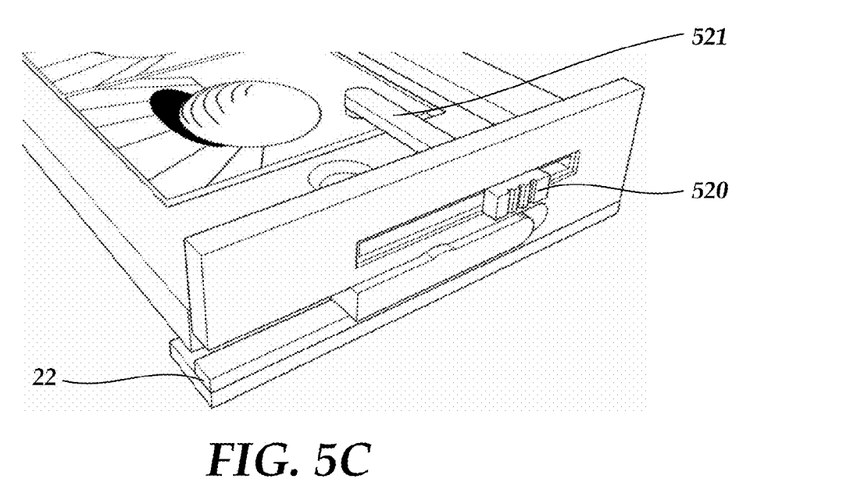

FIGS. 5A-C illustrate a preferred embodiment of mobile device controls 25. FIG. 5A provides a front isometric view of mobile device holder 22 into which mobile device 50 is inserted. FIG. 5B provides a left isometric view of mobile device holder 22. And, FIG. 5C provides a right isometric view of mobile device holder 22. In this embodiment, controls 25 includes two push buttons 510-511 on the left side of mobile device holder 22 and one slider 520, depicted in FIG. 5C only, on the right side of mobile device holder 22. It may be appreciated by one skilled in the art that push buttons 510-511 and slider 520 are embodiments of mechanical controls manually activated by a viewer to select functions from a user interface presented by mobile device 50. In this embodiment, controls 25 are specially adapted for a touch-sensitive display where contacting the surface of the display selects a function from a user interface presented by mobile device 50. Examples of such touch-sensitive displays include the IPHONE from APPLE COMPUTER, and the GALAXY from SAMSUNG ELECTRONICS. In other embodiments, controls 25 are adapted to activate physical buttons or other controls on a mobile device. In yet other embodiments, controls 25 are adapted to interface to a heat-sensitive display or to a proximity-sensitive display.

Push buttons 510-511 are connected to rocker arms 512-513 respectively. When one of push buttons 510-511 is pressed by a viewer its corresponding rocker arm swings downward and a special tip at the end of the rocker arm makes contact with a fixed location on display 51 of mobile device 50.

A viewer can slide slider 520 upwards or downwards; this has the effect of moving slider arm 521 upwards or downwards relative to the side of mobile device 50.

Figure 6A:
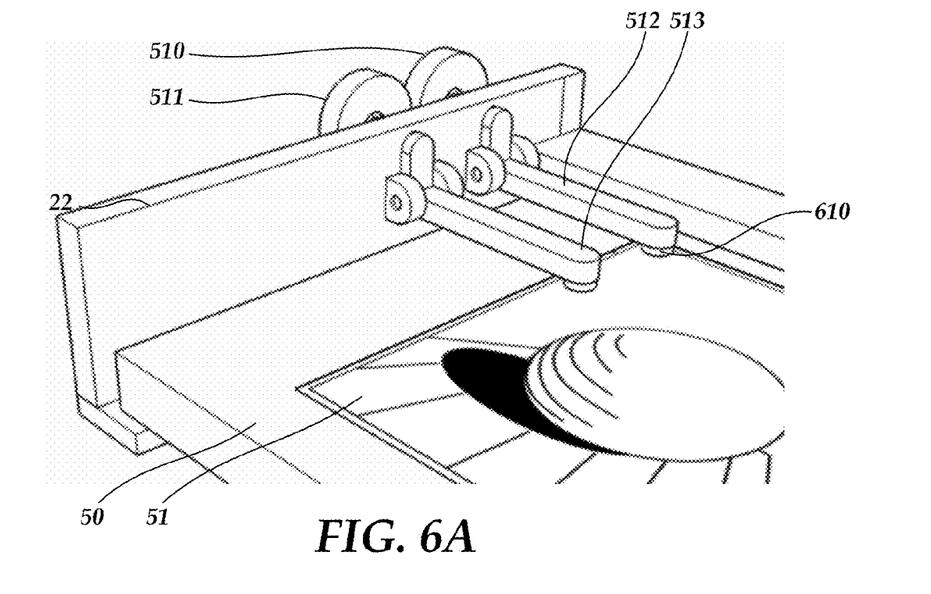
FIGS. 6A and 6B are close-up illustrations of a preferred embodiment of mobile device controls that are used by a viewer using a head mounted display to active functions of a mobile device.
Figure 6B:
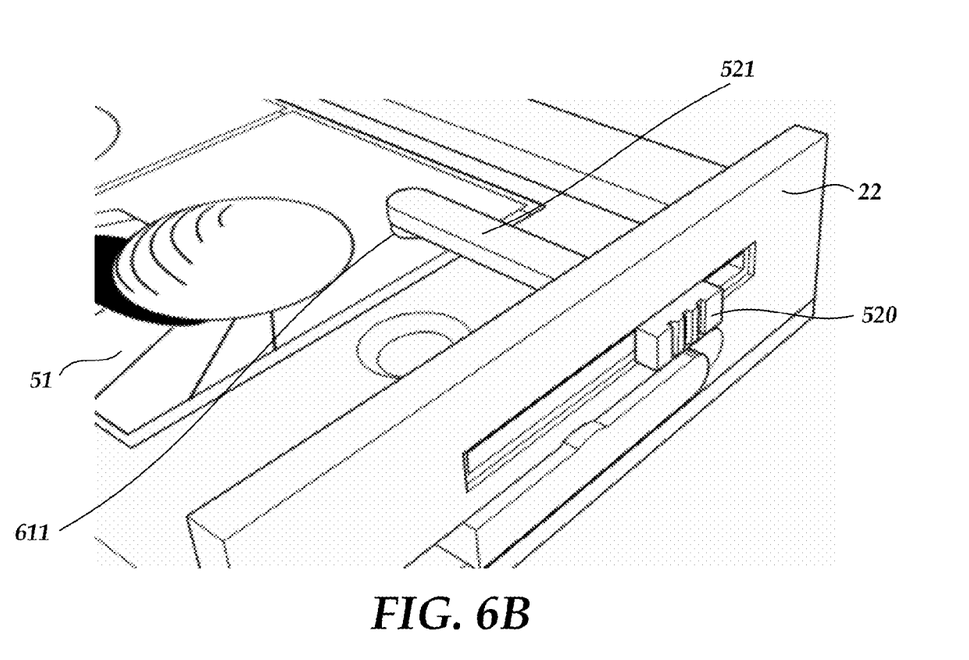

FIGS. 6A and 6B are close-up illustrations of a preferred embodiment of mobile device controls 25 that are used by a viewer using head mounted display 1 to activate functions of mobile device 50. It may be appreciated by one skilled in the art that in other embodiments there may be different mechanical controls or fewer or more than the mechanical controls illustrated in FIGS. 6A-B.

In FIGS. 6A-B, mobile device 50 is secured by mobile device holder 22. With reference to FIG. 6A, when one of push buttons 510-511 is pressed by a viewer its corresponding rocker arm 512-513 swings downward and a special tip 610 at the end of the rocker arm makes contact with a fixed location on display 51 of mobile device 50. Rocker arms 512-513 include mechanical linkages that protrude through mobile device holder 22 and attach to and secure push buttons 510-511.

With reference to FIG. 6B, a viewer slides slider 520 up or down, to position a slider arm 521 parallel to the side of mobile device 50. In one embodiment, unlike push buttons 510-511 slider arm 521 does not include a rocker arm mechanism. Rather, a tip 611 of slider arm 521 is always in contact with display 51. Thus, tip 611 remains in contact with and slides up and down on display 51, parallel to the side of mobile device 50. In one embodiment, slider 520 is made of a single piece of plastic. In this embodiment, slider 520, i.e. the part that makes contact with a viewer's thumb, and slider arm 521 are part of a single piece of molded plastic. In one embodiment, tips 610 and 611 are made of a material that is adapted to the particular touch sensing technology used by mobile device 50.

Mobile device controls 25 can be adapted to work with a variety of mobile device screens, including inter alia capacitive screens, pressure sensitive screens, multi-touch and gesture-based screens. For example, in the case of a capacitive screen, which is a type of touch sensitive screen that employs capacitive touch sensors to detect viewer interactions, tips 610 and 611 are made of an electrically conductive material that increases or changes the relative capacitance, or parasitic capacitance to ground, when contact is made with the capacitive sensors of the display. In some embodiments, tips 610-611 include a contact surface made, at least in part, of a conductive fabric. Such a conductive fabric may increase flexibility of the tip to enlarge the point of contact with the display and thereby enhance electrical coupling at the point of contact. In some embodiments the tip may be made of a flexible material such as plastic embedded with conductive material such as metallic wires or grains.

Controls 25 are specially designed to work with a variety of computer programs, including 3D display programs, 3D games and movie players, that runs on mobile device 50. Such computer programs include a user interface that can be operated using controls 25. For example, in one embodiment, push buttons 510-511 each enable the viewer to select a single function while slider 520 enables the viewer to activate a number of functions by selecting an item from a menu that is arranged along the side of display 51. One embodiment of a menu is described with reference to FIG. 7 hereinbelow. A computer program that works with controls 25 may be a specially designed program that works in conjunction with head mounted display 1 or it may be a commercially available program that operates on a mobile device. There are several commercially available 3D display programs available for mobile devices such the IPHONE including MY3D from Hasbro Inc.

Figure 7:
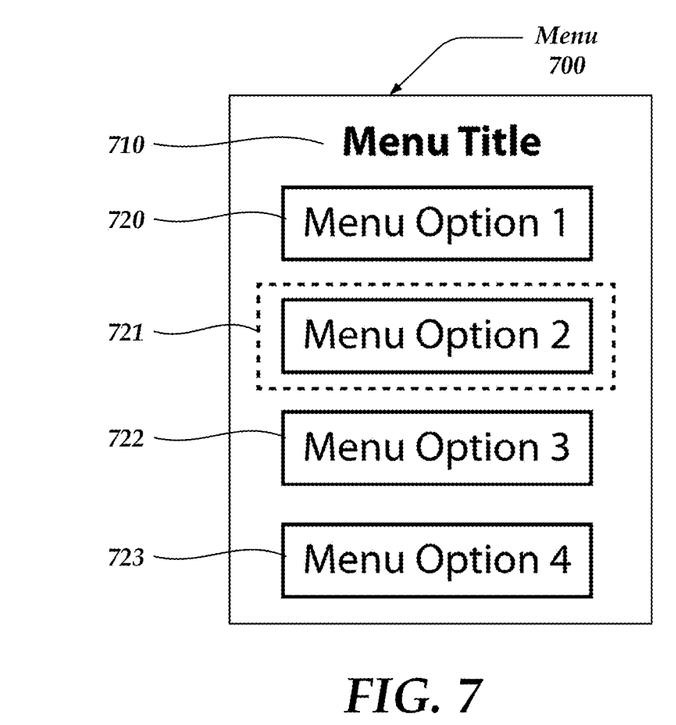
FIG. 7 illustrates one embodiment of a menu that appears on a mobile device display, and consequently is projected onto an eyepiece, in response to a viewer using a mobile device control on a head mounted display.

FIG. 7 illustrates one embodiment of a menu 700 that appears on mobile device display 51, and consequently is projected onto eyepiece 40, in response to a viewer using mobile device controls 25 on head mounted display 1. In this embodiment, a viewer uses mobile device controls 25 to select a menu item from menu 700, thereby causing mobile device 50 to activate a corresponding function. Menu 700 includes a menu title 710 and four menu options 720-723. In this example, menu option 721 is highlighted.

In one embodiment mobile device controls 25 include a back button, corresponding to one of push button 510-511, an enter button corresponding to the other of push button 510-511 and an up-down slider, corresponding to slider 520. In this embodiment, a viewer first pushes enter button to signal to mobile device 50 that it should present menu 700. Consequently, mobile device 50 displays a menu such as menu 700 that provides one or more menu options 720-723. Next, the viewer uses the up-down slider to select one of menu options 720-723 and then activates the selected menu option using the enter button.

Figure 8:
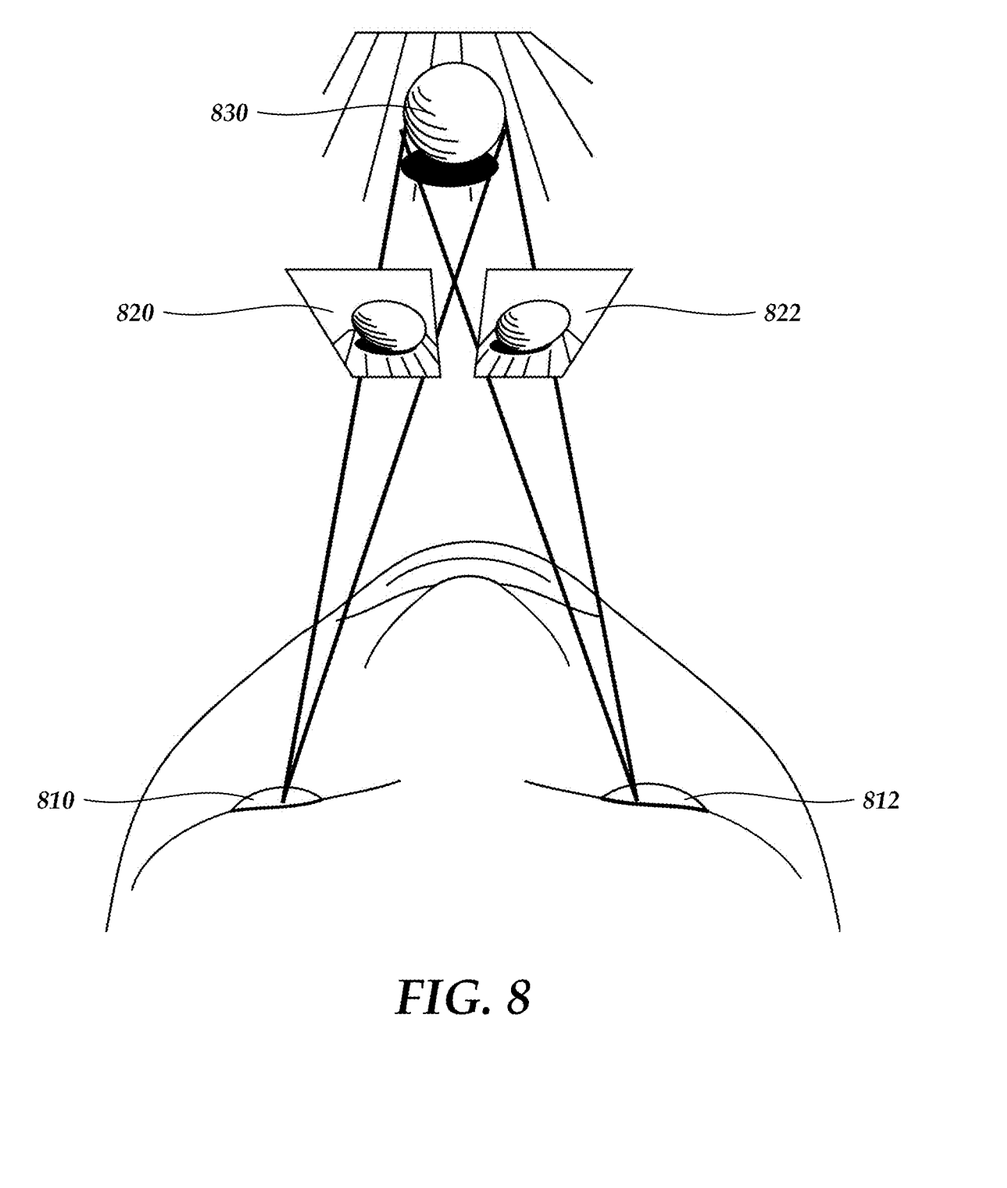
FIG. 8 is an illustration of the principle of stereoscopic imagery.

FIG. 8 is an illustration of the principle of stereoscopic imagery. In the illustration, a viewer's left eye 810 looks at one image that is displayed or projected onto a left surface 820. Similarly, a viewer's right eye 812 looks at a different, slightly offset, image that is displayed or projected onto a right surface 822. The viewer's mind combines the two images, thus giving the viewer the perception of a single, combined, stereoscopic image 830, that appears in the center. The focal length, i.e. the distance at which the stereoscopic image appears to the viewer is further than the distance to the left and right surfaces, as indicated by the distance to the 3D ball depicted in stereoscopic image 830.

A stereoscopic or 3D computer program that runs on mobile device 50 uses this principle to achieve an illusion of depth by projecting two slightly offset images, that display side-by-side on a mobile device, separately to the left and right eye of the viewer, i.e. one image is projected onto a portion of eyepiece 40 that is exclusively viewed by the left eye and the other image is projected onto a portion of eyepiece 40 that is exclusively viewed by the right eye. These two-dimensional images are then combined by the viewer's brain to give the perception of 3D depth.

It may be appreciated by one skilled in the art, that two identical images can be projected onto left surface 820 and onto right surface 822. In this case, the mind combines the two images properly, as in stereoscopy, but the resulting picture lacks in depth; i.e. the viewer sees a 2 dimensional image rather than a 3 dimensional image. Thus, HMD 1 can be used for viewing non-stereoscopic 2D images as well.

Figure 9:
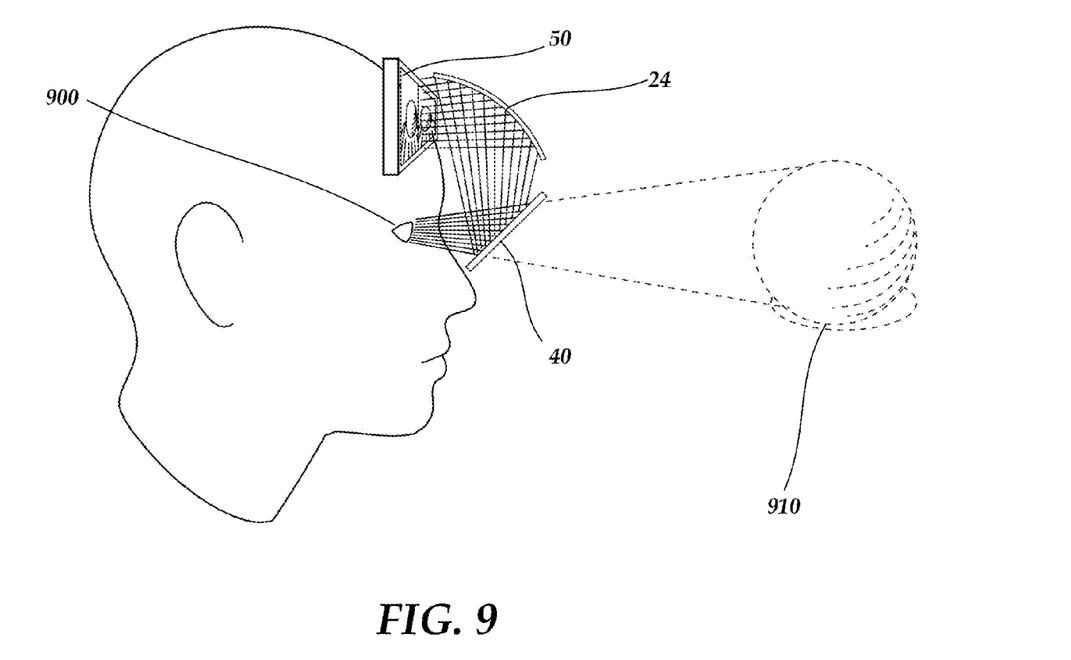
FIG. 9 illustrates the projection path of a three dimensional image from a mobile device to a reflecting surface onto an eyepiece.

FIG. 9 illustrates the projection path of a three dimensional image from mobile device 50 to reflecting surface 24 onto eyepiece 40. Mobile device mobile device 50 displays an image, which is reflected by reflecting surface 24 onto eyepiece 40. Concurrently, a viewer, using their eyes 900 looks at eyepiece 40 which is either opaque or partially transparent and sees the reflected image.

If eyepiece 40 is partially transparent, then the world appears through eyepiece 40 and the image, represented in FIG. 9 as three dimensional object 910, appears, centrally positioned, and superimposed over the world.

FIGS. 10A-D give examples of how the controls of a head mounted display can activate functions on a mobile device. In each of the examples, a viewer uses push buttons 510-511 and slider 520 either individually or in combination to activate functions in a application running on mobile device 50. Typically, the application presents a graphical user interface that displays selectable commands where each command corresponds to a function to be performed by the application. In these examples, one of push buttons 510-511 is assigned as a back button and the other push button is assigned as a select or enter button. Thus, typically but not necessarily the application displays a selectable back command such as found in games or in a web browser. And slider 520 operates as the slider. In addition, pressing the back and select buttons at the same time may be interpreted by mobile device 50 as issuing an additional command. Further, in the case of the example given in FIG. 10A, a viewer can issue two additional commands by tilting their head left and tilting their head right. These two gesture commands are available in the case that mobile device 50 is equipped with the necessary hardware, such as a compass, a gyroscope or an accelerometer, to provide tilt and directional information to an application, or computer program running on mobile device 50.

The examples provided in FIGS. 10A-10D show how the combination of two mechanical buttons in combination with a single slider and in some cases head tilt gestures, can be used to operate a variety of existing and future programs or applications that run mobile devices. These examples don't pertain specific commercial applications but rather show how mechanical controls 24 can be used to activate typical functions found in broad classes of commercial programs.

Figure 10A:
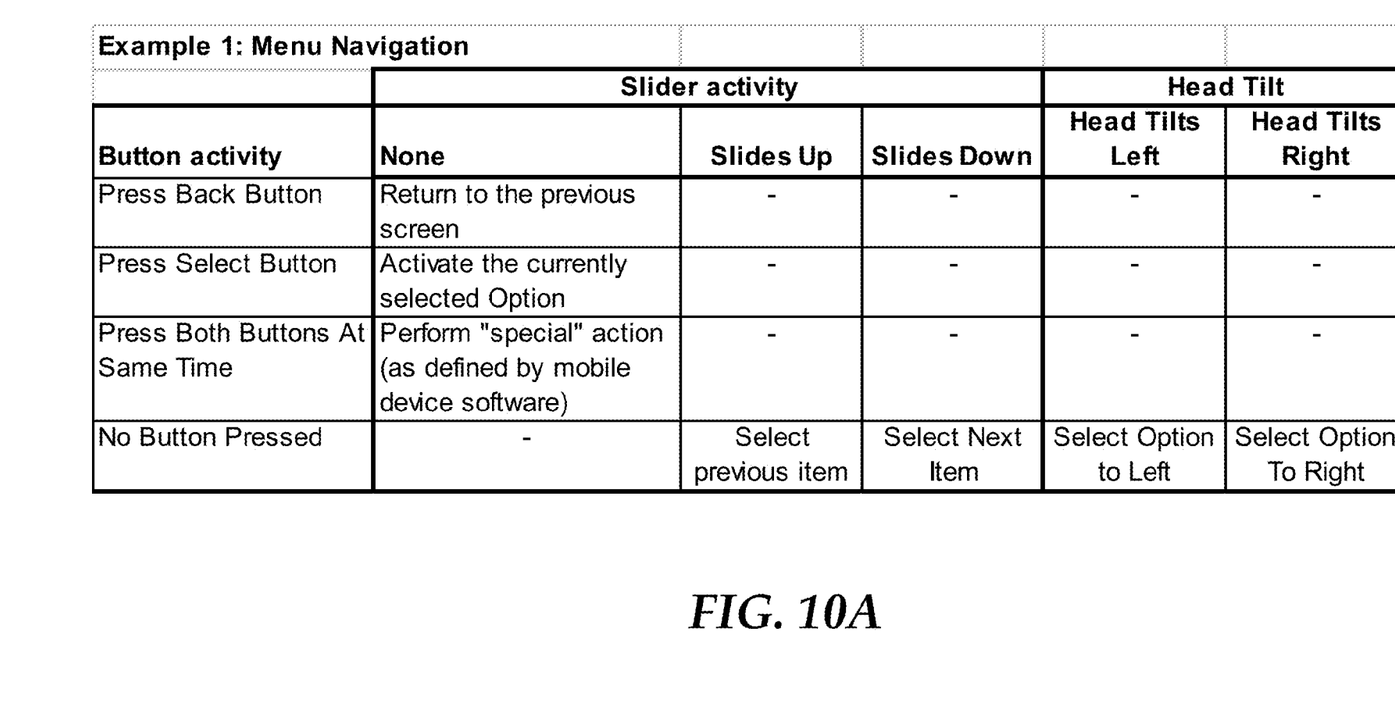
FIG. 10A provides an example of how push buttons and a slider, as well as head tilt gestures, can be used to navigate a menu interface on a mobile device.

FIG. 10A provides an example of how push buttons 510-511 and slider 520, as well as head tilt gestures, can be used to navigate a menu interface on mobile device 50. The table depicted in Example 1 indicates the function that is activated in response to one or more of a button being pressed, the slider being slid up or down, or the viewer's head tilting left or right.

Figure 10B:
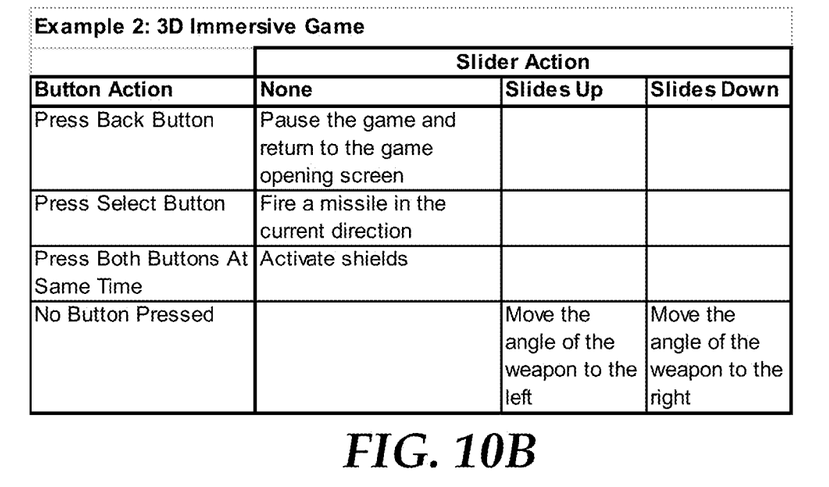
FIG. 10B provides an example of how push buttons and a slider may be used to control a 3D immersive game that runs on a mobile device.

FIG. 10B provides an example of how push buttons 510-511 and slider 520, may be used to control a 3D immersive game that runs on mobile device 50. In this example pressing the back button pauses the game and returns to the game opening screen; pressing the select button fires a missile in the current direction; and pressing both buttons at the same time activates shields. Sliding the slider up moves the angle of a weapon to the left and sliding the slider down moves the angle of a weapon to the right.

Figure 10C:
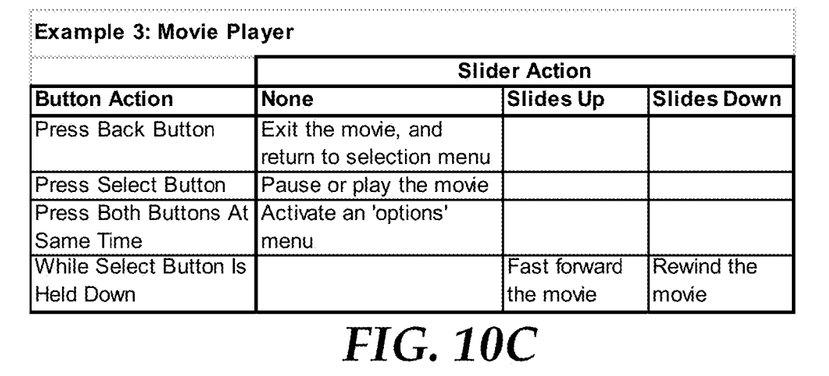
FIG. 10C gives an example of how push buttons and a slider may be used to control a movie player that runs on a mobile device.

FIG. 10C gives an example of how push buttons 510-511 and slider 520, may be used to control a movie player that runs on mobile device 50.

Figure 10D:
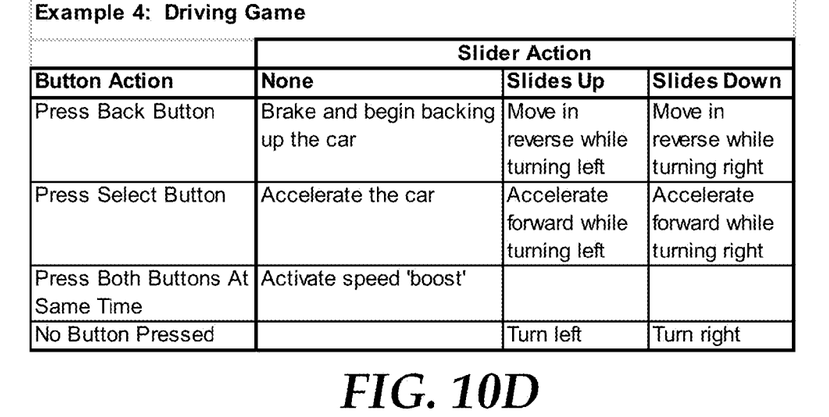
FIG. 10D gives an example of how push buttons and a slider may be used to control a driving game that runs on a mobile device.

FIG. 10D gives an example of how push buttons 510-511 and slider 520, may be used to control a driving game that runs on mobile device 50.

In reading the above description, persons skilled in the art will realize that there are many apparent variations that can be applied to the methods and systems described.

What is claimed is:

1. A head mounted display device for displaying images from a mobile device, comprising:
   a strap that secures the head mounted display to the head of a viewer;
   a viewing assembly connected to the strap, comprising:
      a housing;
      a mobile device holder, connected to the housing, for securing the mobile device;
      a reflecting surface, connected to the housing, that reflects images displayed by the mobile device;
      at least one mechanical control that when activated by the viewer causes a tip to physically contact the display screen of the mobile device to select a function from a user interface presented on the display screen by the mobile device, and wherein the at least one mechanical control comprises a push button or a slider; and
   an eyepiece, connected to the housing, onto which the reflecting surface reflects the images.

2. The device of claim 1 wherein said mobile devices displays a first image on its right side and a second image on its left side and wherein said reflecting surface comprises a right mirror that reflects images from the right side of the mobile device and a left mirror that reflects images from the left side of the mobile device.

3. The device of claim 2 wherein said viewing assembly further comprises an opaque optical block that prevents images from the left side of the mobile device from crossing over to the right mirror and prevents images from the right side of the mobile device from crossing over to the left mirror.

4. The device of claim 1 wherein the eyepiece comprises two separate elements.

5. The device of claim 1 wherein the eyepiece comprises a single element.

6. The device of claim 1 wherein the at least one mechanical control comprises a push button that comprises a mechanical linkage attached to said push button, wherein the tip attaches to the mechanical linkage and wherein said activating by the viewer comprises pushing the at least one push button by the viewer causing the tip to contact the display screen.

7. The device of claim 6 wherein the display screen is a capacitive display screen and the tip is made of an electrically conductive material that changes the capacitance when it contacts the capacitive display screen.

8. The device of claim 1 wherein the at least one mechanical control comprises a slider capable of being slid in an upward or downward direction by the viewer and wherein said slider attaches to an arm and said tip attaches to said arm, and
   wherein said activating by the viewer comprises sliding the slider upward or downward by the viewer and said tip performs said contacting the display screen when the viewer slides the slider.

9. The device of claim 8 wherein the display screen is a capacitive display screen and said tip is made of an electrically conductive material that changes the capacitance when it contacts the display screen.

* * * * *